(12) United States Patent
Sheng

(10) Patent No.: US 8,302,958 B2
(45) Date of Patent: Nov. 6, 2012

(54) SHEET FEEDING DEVICE WITH GROOVED ELASTIC PAD AND IMAGE PROCESSING APPARATUS USING THE SAME

(75) Inventor: Thomas Sheng, Hsinchu (TW)

(73) Assignee: Avision Inc.

( * ) Notice: Subject to any disclaimer, the term of this patent is extended or adjusted under 35 U.S.C. 154(b) by 0 days.

(21) Appl. No.: 13/288,679

(22) Filed: Nov. 3, 2011

(65) Prior Publication Data

US 2012/0126476 A1    May 24, 2012

(30) Foreign Application Priority Data

Nov. 19, 2010  (TW) ................ 99139945 A

(51) Int. Cl.
*B65H 3/52* (2006.01)
(52) U.S. Cl. ...................................... 271/121
(58) Field of Classification Search ............ 271/121
See application file for complete search history.

(56) References Cited

U.S. PATENT DOCUMENTS

| | | | | |
|---|---|---|---|---|
| 4,982,942 A * | 1/1991 | Konishi et al. | ............ | 271/119 |
| 5,549,289 A * | 8/1996 | Sonnenburg et al. | ......... | 271/121 |
| 5,573,338 A * | 11/1996 | Morikawa et al. | ............ | 400/611 |
| 6,550,761 B1 * | 4/2003 | Chiang | ............ | 271/104 |
| 7,841,592 B2 * | 11/2010 | Wu et al. | ............ | 271/121 |
| 2003/0085507 A1 * | 5/2003 | Chiang | ............ | 271/121 |
| 2006/0012109 A1 * | 1/2006 | Chiang | ............ | 271/121 |

FOREIGN PATENT DOCUMENTS

| JP | 06127721 A | * | 5/1994 |
|---|---|---|---|
| JP | 06227693 A | * | 8/1994 |

* cited by examiner

*Primary Examiner* — David H Bollinger

(57) ABSTRACT

A sheet feeding device, for transporting a sheet into a transporting path in an image processing apparatus, includes an elastic pad and a feeding roller for feeding the sheet. The elastic pad is bent and disposed opposite the feeding roller and applies an acting force to the feeding roller to separate the sheet from a stack of sheets by cooperating with the feeding roller. The elastic pad has a first side and an opposite second side. The second side is formed with a groove. The elastic pad is bent at an angle at the groove.

12 Claims, 7 Drawing Sheets

SHEET FEEDING DEVICE WITH GROOVED ELASTIC PAD AND IMAGE PROCESSING APPARATUS USING THE SAME

This application claims priority of No. 099139945 filed in Taiwan R.O.C. on Nov. 19, 2010 under 35 USC 119, the entire content of which is hereby incorporated by reference.

BACKGROUND OF THE INVENTION

1. Field of the Invention

The present invention relates to a sheet feeding device and an image processing apparatus using the same, and more particularly to a sheet feeding device with a grooved elastic pad and an image processing apparatus using the same.

2. Related Art

A conventional sheet separator of a scanner is usually composed of a feeding roller and a friction pad. FIG. 9 is a schematic illustration of a conventional friction pad 210 combined with a feeding roller 220. As shown in FIG. 9, a nip is formed between the feeding roller 220 and the friction pad 210 mounted on a body 230. The feeding roller 220 and the friction pad 210 separate an individual sheet (the bottommost sheet, in this case) from the stack of sheets SS, relying on the difference of the frictions there among the sheets SS, the feeding roller 220 and the friction pad 210. By this means, the individual sheet is being fed in and transported to the scan region.

The curvilinear relationship of the position X in the sheet-feeding direction versus the static friction force Fsf being produced is shown in FIG. 9. Because the friction pad 210 is a rubber pad of uniform thickness, it cannot apply uniform pressures on the feeding roller 220 along the entire length of the nip; and only at a small part of the nip, a sufficient amount of friction is generated for use of separating the sheets SS. Due to the concentrated pressures on this small part of the friction pad 210, the friction pad 210 tends to wear out sooner than expected and consequently, decline in the quality of the sheet separation function will take place.

SUMMARY OF THE INVENTION

Accordingly, the present invention has been proposed to solve the problems of the prior art, and it is an object of the present invention to provide a sheet feeding device with a grooved elastic pad and an image processing apparatus using the same. The grooved elastic pad is configured such that the static friction between the elastic pad and a feeding roller becomes more uniform, the deterioration and wearing of the elastic pad are reduced, and a sheet document or a recording medium, such as a thick paper sheet or a cardboard, can be transported smoothly without being bent or deformed.

To achieve the above-identified object, the present invention provides a sheet feeding device transporting a sheet into a transporting path in an image processing apparatus which comprises a feeding roller feeding the sheet and an elastic pad, bent and disposed opposite the feeding roller, applying an acting force to the feeding roller to separate the sheet from a stack of sheets by cooperating with the feeding roller. The elastic pad has a first side and an opposite second side. The second side is formed with a groove, and the elastic pad is bent at an angle at the groove.

In addition, the present invention further provides an image processing apparatus including the sheet feeding device and an image processing module, disposed in the transporting path, for processing image data.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings.

Figure 1:
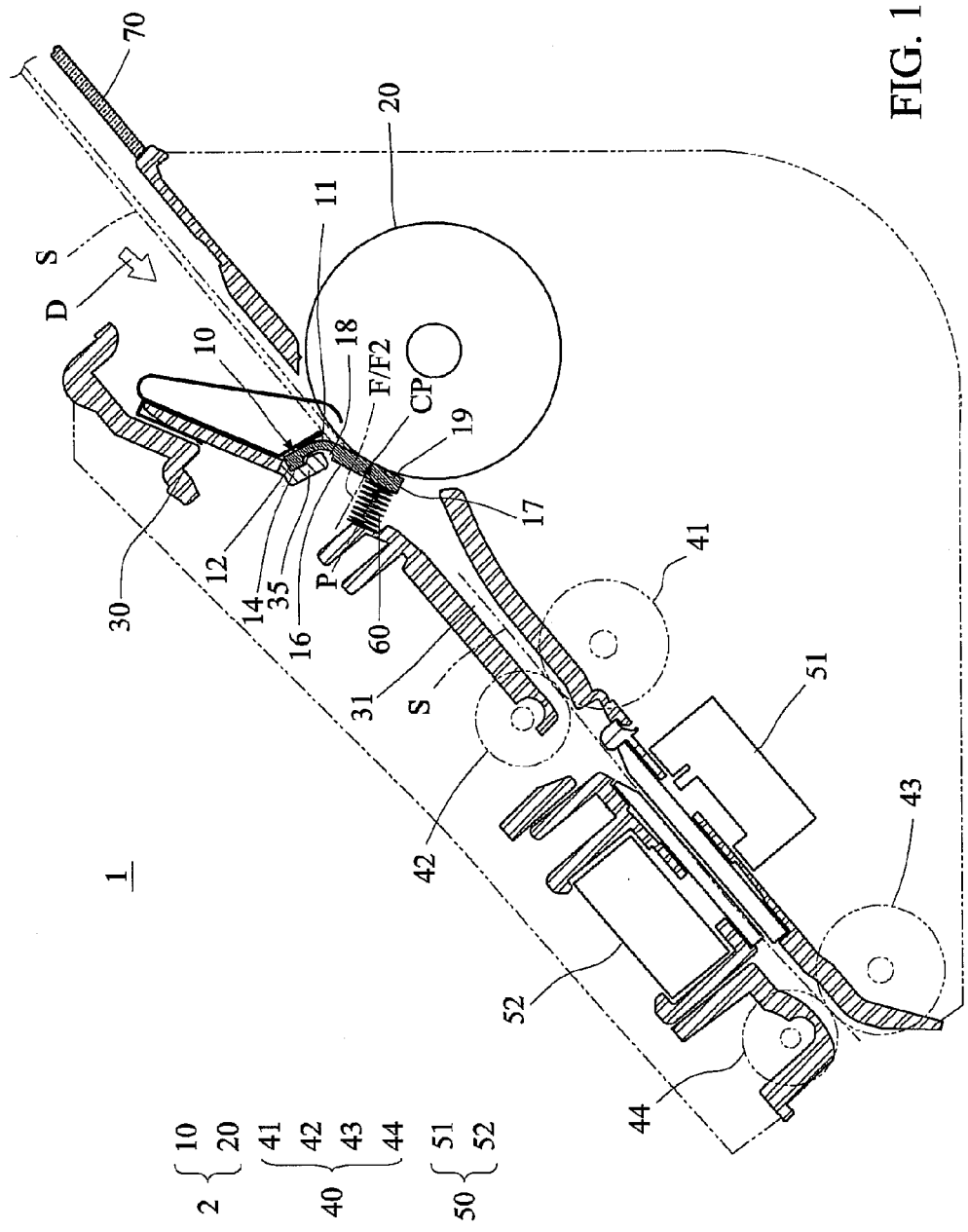
FIG. 1 is a schematic illustration of an image processing apparatus according to a preferred embodiment of the present invention.
Figure 2:
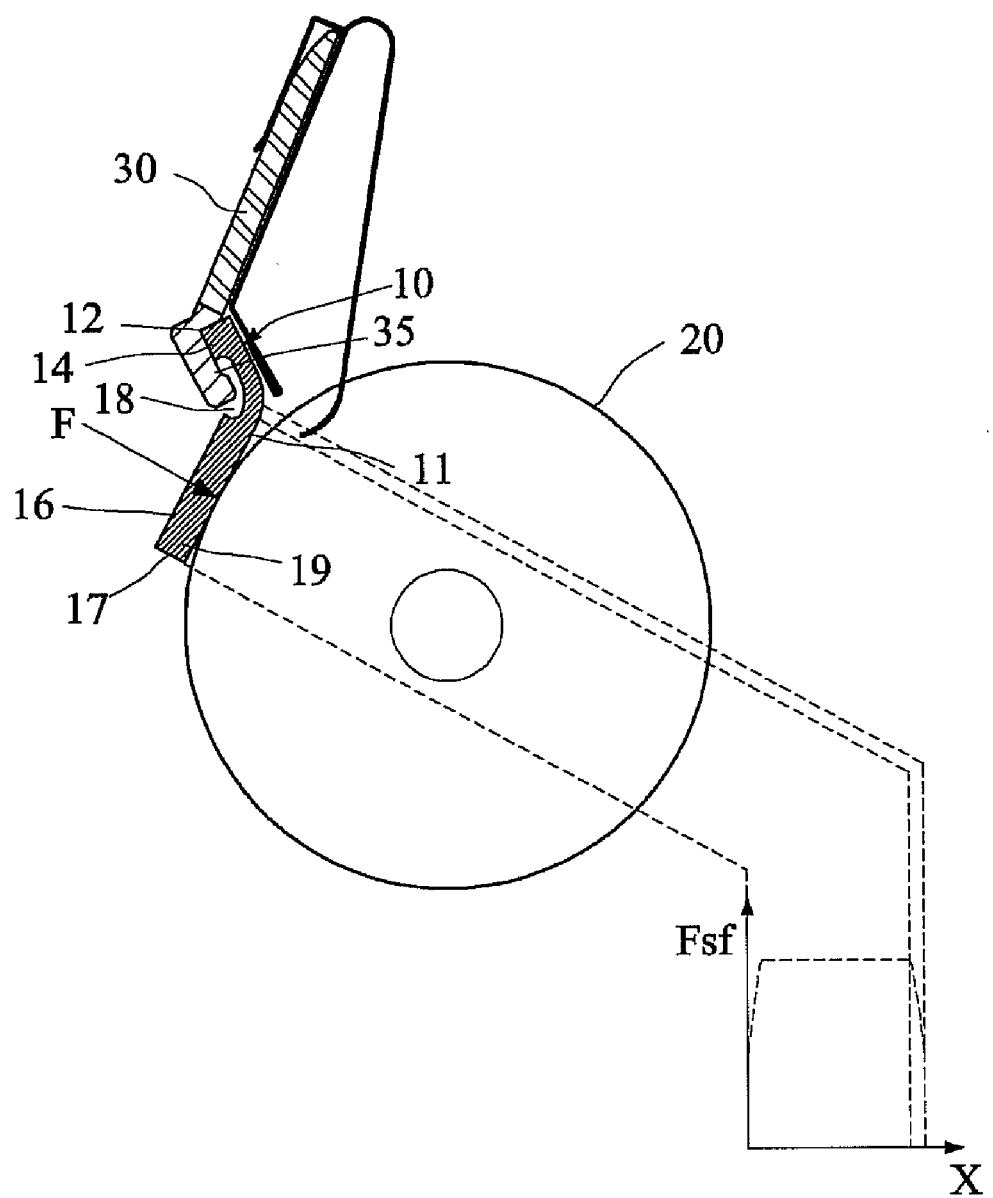
FIGS. 2 and 3 are respectively an assembled view and an exploded view of an elastic pad and a feeding roller.
Figure 3:
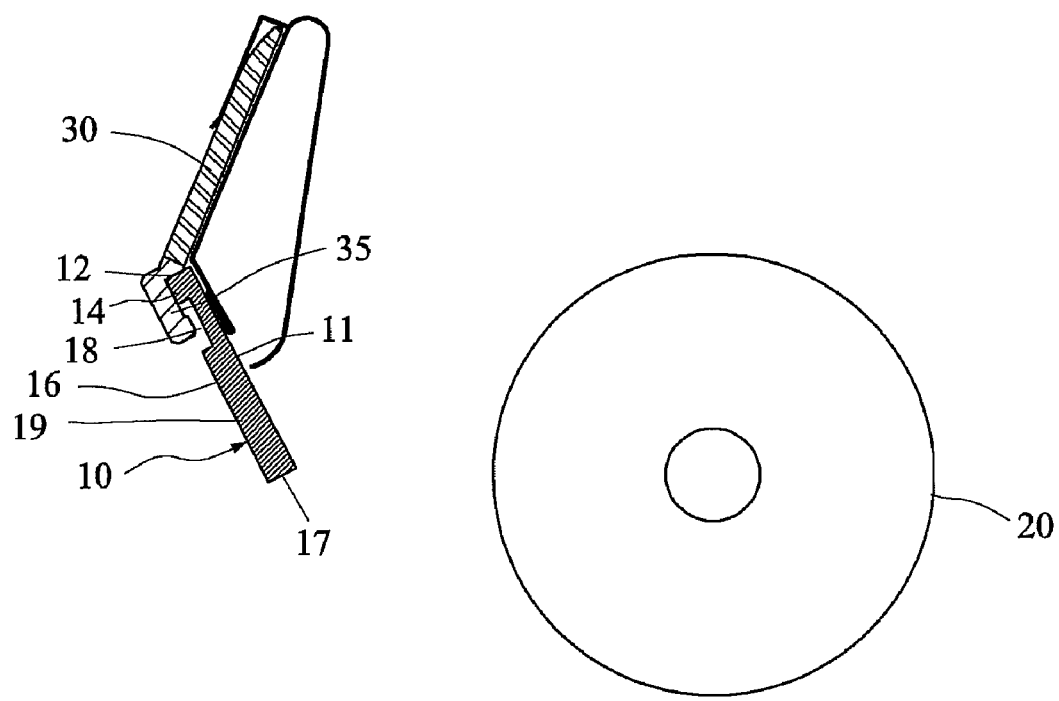

FIG. 1 is a schematic illustration of an image processing apparatus 1 according to a preferred embodiment of the present invention. FIGS. 2 and 3 are respectively an assembled view and an exploded view of an elastic pad and a feeding roller. As shown in FIGS. 1 to 3, the image processing apparatus 1 of the present invention, such as a scanner, a fax machine, a multi-function peripheral or a printer, is for transporting a sheet S into a transporting path 31. The image processing apparatus 1 includes a sheet feeding device 2, which includes an elastic pad 10 and a feeding roller 20. The image processing apparatus 1 further includes a body 30, a sheet-transporting mechanism 40, an image processing module 50, a biasing member 60 and a supply tray 70.

The supply tray 70, connected to the body 30, stores a plurality of sheets S, such as paper sheets, or thicker business cards, identifications, magnetic cards, credit cards, and etc. The feeding roller 20, rotatably disposed, for example, in the body 30, feeds the sheet S. Specifically speaking, a first end 12 of the elastic pad 10 is attached to a holder 35, and a second end 17 of the elastic pad 10 is a free end. The holder 35 is mounted on the body 30. The elastic pad 10 is bent and disposed opposite the feeding roller 20, and applies an acting force F to the feeding roller 20 to separate the sheet S from a stack of sheets by cooperating with the feeding roller 20, such that the sheet S enters the transporting path 31 individually. When the elastic pad 10 is separated from the feeding roller 20, as shown in FIG. 3, the elastic pad 10 is released and appears to be flat.

The elastic pad 10 is made of any elastic material, such as rubber, and has a first side 11 and an opposite second side 16. The second side 16 is formed with a groove 18, which makes the elastic pad 10 become a grooved elastic pad and is advantageous to the bending of the elastic pad 10. In FIGS. 1 and 2, the elastic pad 10 is bent at an angle at the groove 18, wherein the angle ranges from 0 to 180 degrees, for example. Thus, the elastic pad 10 includes a first section 14 closer to the first end 12 and a second section 19 closer to the second end 17. The second section 19 is in pressure contact with the feeding roller 20. The groove 18 lies between the first section 14 and the second section 19.

The groove 18 is extended crosswise of the elastic pad and positioned transversely to a transporting direction D of the sheet S. In this embodiment, the first side 11 faces towards the feeding roller 20 and the groove 18 is located on the second side 16 which faces away from the feeding roller 20, whereas in another embodiment the second side 16 may face towards the feeding roller 20 and, in this case, the groove 18 located on the second side is facing outwards.

The biasing member 60 is disposed at a side of the second section 19 and provides a pressure P to the second section 19. By the pressure P, the biasing member 60 urges the second section 19 towards the feeding roller 20 and applies a second acting force F2 to the feeding roller 20. In this embodiment, the biasing member 60 includes a compression spring.

The sheet-transporting mechanism 40, disposed downstream of the sheet feeding device 2, transports the sheet S along the transporting path 31. In this embodiment, the sheet-transporting mechanism 40 includes transporting rollers 41, 42, 43 and 44.

The image processing module 50, disposed in the transporting path 31, processes image data. In this embodiment, the image processing module 50 includes a scanning module 51 or two scanning modules 51 and 52. The scanning module 51/52 scans the sheet S and generates the image data. The two scanning modules 51 and 52 are disposed on two opposite sides to scan images on two sides of the sheet S and generate the image data.

Figure 4:
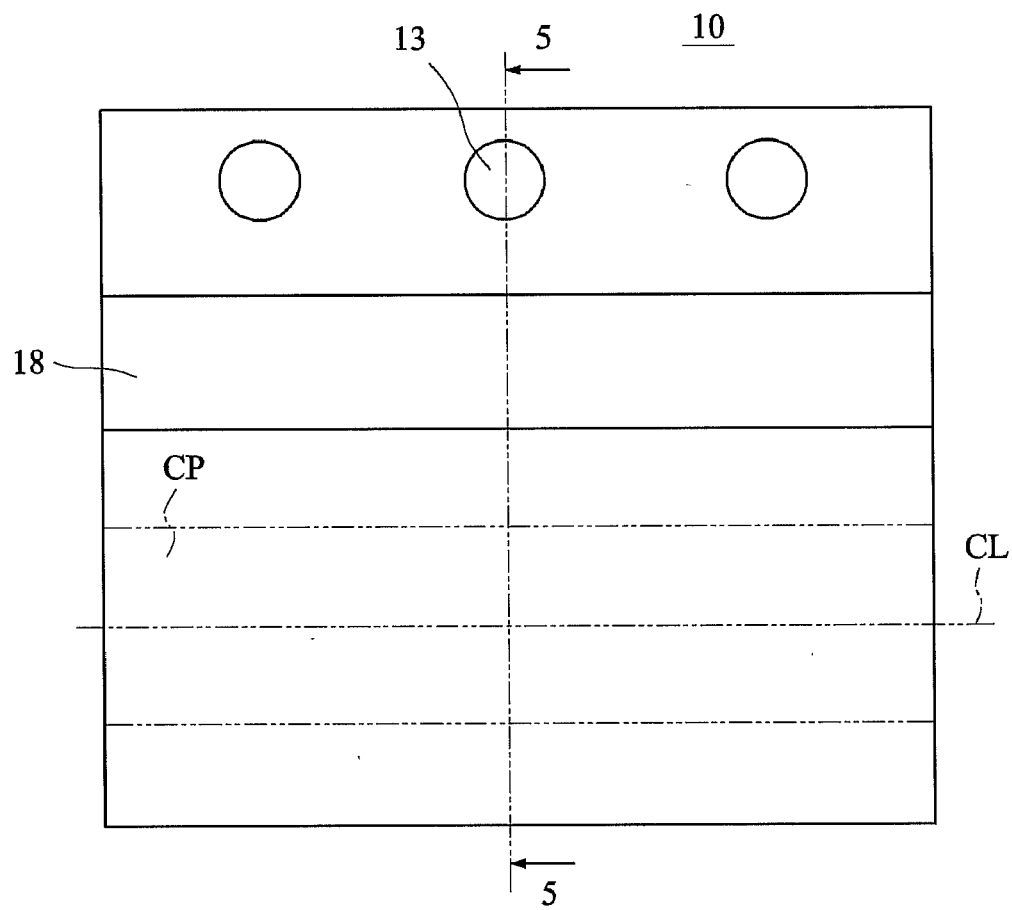
FIG. 4 is a plane view of the elastic pad.
Figure 5:
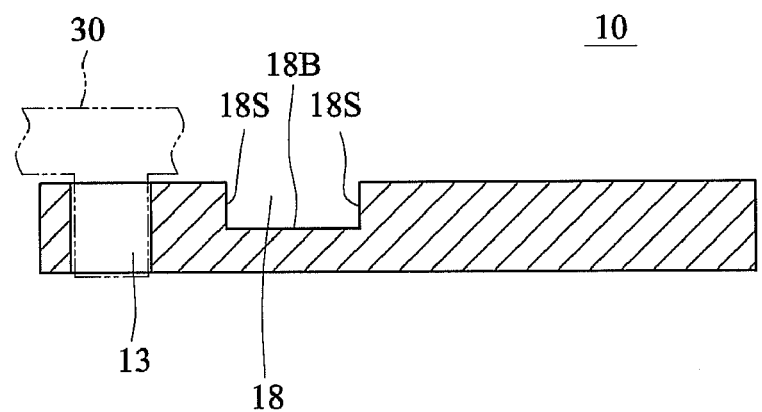
FIG. 5 is a cross-sectional view taken along a line 5-5 of FIG. 4.

In the present invention, the static friction Fsf between the second section 19 and the feeding roller 20 is evenly distributed along the length of the pressure contact part between the second section 19 and the feeding roller 20, as shown in FIG. 2, and sufficient amount of static friction is produced to facilitate the sheet separation operation. Because the first section 14 is separated from the second section 19 by the groove 18, the elastic pad 10 is able to be bent into the desired angle, and the second section 19 can apply pressures uniformly onto the feeding roller 20. FIG. 4 is a plane view of the elastic pad. FIG. 5 is a cross-sectional view taken along a line 5-5 of FIG. 4. As shown in FIGS. 4 and 5, the pressure contact part (a nip CP) is formed and centered at a center line CL of the second section 19. In the prior art, however, most of the pressure is stressed on the end of the friction pad 210.

In FIGS. 4 and 5, the first end 12 of the elastic pad 10 has at least one positioning hole 13 through which the elastic pad 10 is mounted on the holder 35. In this embodiment, the first end 12 of the elastic pad 10 has three positioning holes 13.

Figure 6:
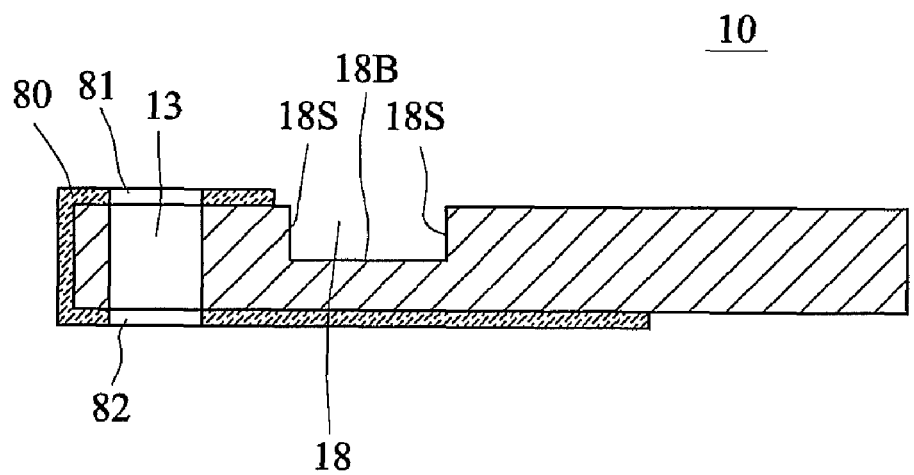
FIG. 6 is a cross-sectional view of the elastic pad of FIG. 5 combined with an elastic sheet.

FIG. 6 is a cross-sectional view of the elastic pad 10 of FIG. 5 combined with an elastic sheet 80. As shown in FIG. 6, the elastic sheet 80 partially covers the elastic pad 10, and the elastic pad 10 is attached to the body 30 through the elastic sheet 80. The elastic sheet 80 also has the sheet separation function—increasing the friction between the elastic pad 10 and the sheets, and can disperse the fixing force of the holder 35 exerted on the elastic pad 10 to prevent the occurrence of stress concentration. The elastic sheet 80 has through holes 81 and 82 corresponding to the positioning holes 13. As shown in FIGS. 5 and 6, the groove 18 has a planar bottom surface 18B and several sidewalls 18S.

Figure 7:
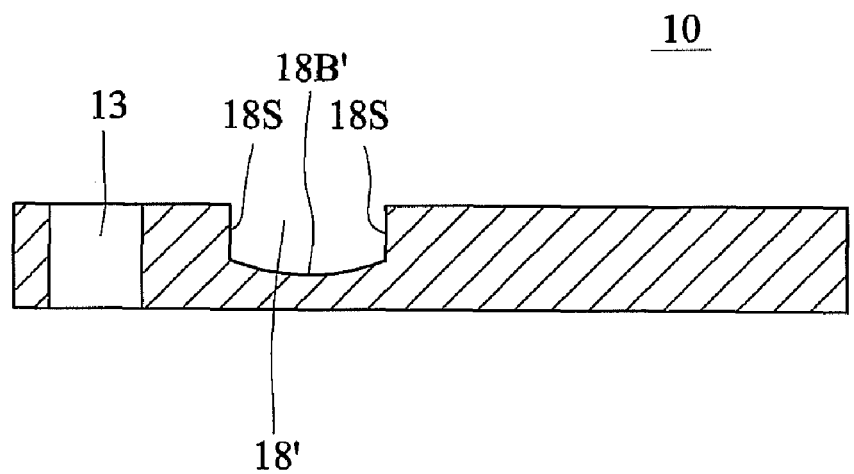
FIG. 7 is a cross-sectional view of the elastic pad of FIG. 5 in another example.

FIG. 7 is a cross-sectional view of the elastic pad 10 of FIG. 5 in another example. As shown in FIG. 7, the groove 18' has a curved bottom surface 18B' and several sidewalls 18S so that the elastic pad 10 can be effectively bent.

Figure 8:
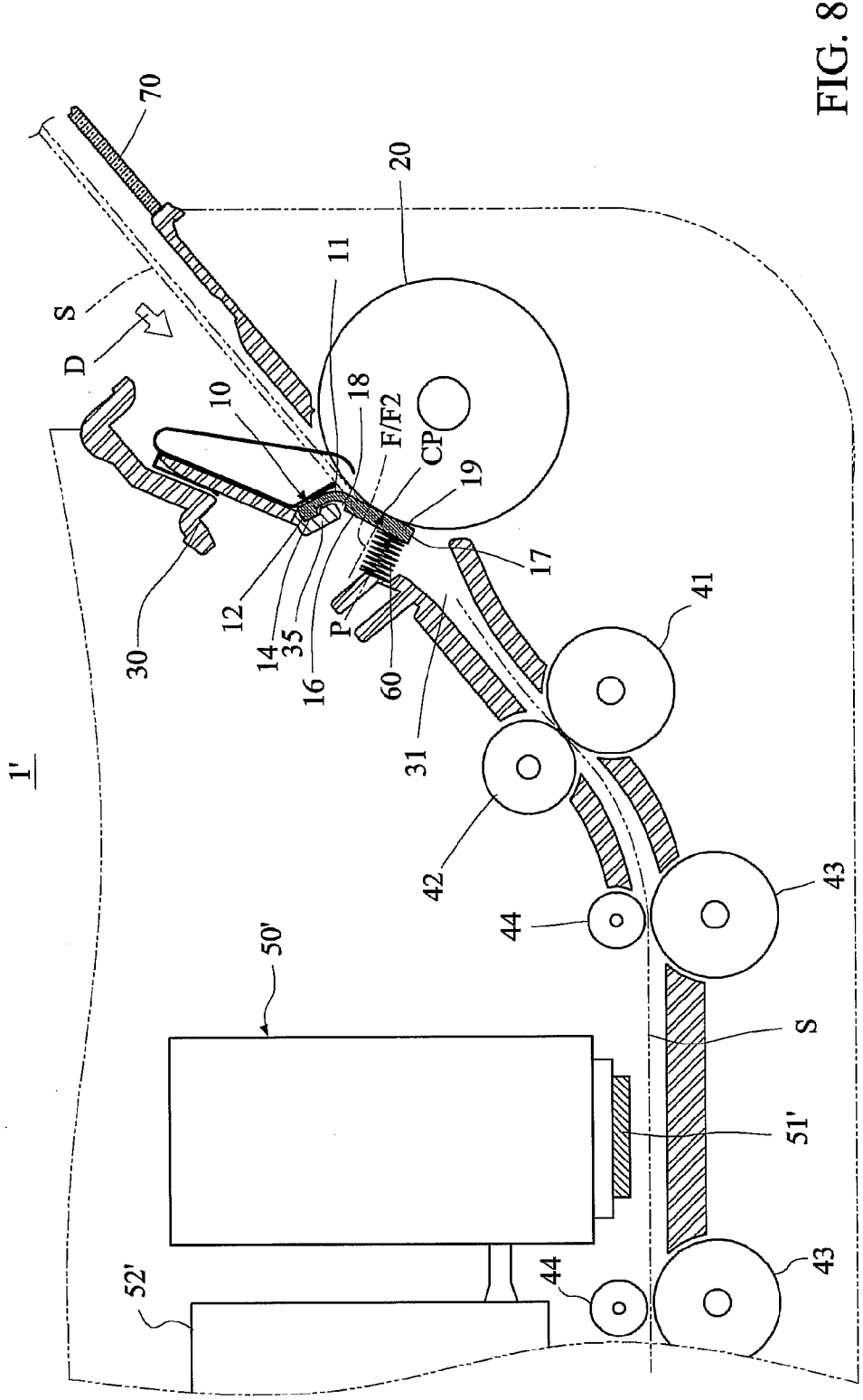
FIG. 8 is a schematic illustration of an image processing apparatus according to another embodiment of the present invention.

FIG. 8 is a schematic illustration of an image processing apparatus 1' according to another embodiment of the present invention. As shown in FIG. 8, the image processing apparatus 1' of this embodiment is similar to the image processing apparatus 1 of FIG. 1 except that the image processing apparatus 1' is a printer. Thus, the image processing module 50' is a printing module for printing image data on the sheet S. In this embodiment, the printing module includes an ink-jet print head 51' and an ink supplying unit 52'. The ink supplying unit 52', connected to the ink-jet print head 51', supplies the ink to the ink-jet print head 51'. However, the present invention is not restricted thereto. The printing module may also be a dot-matrix printing module, a laser printing module or a heat transfer printing module.

Figure 9:
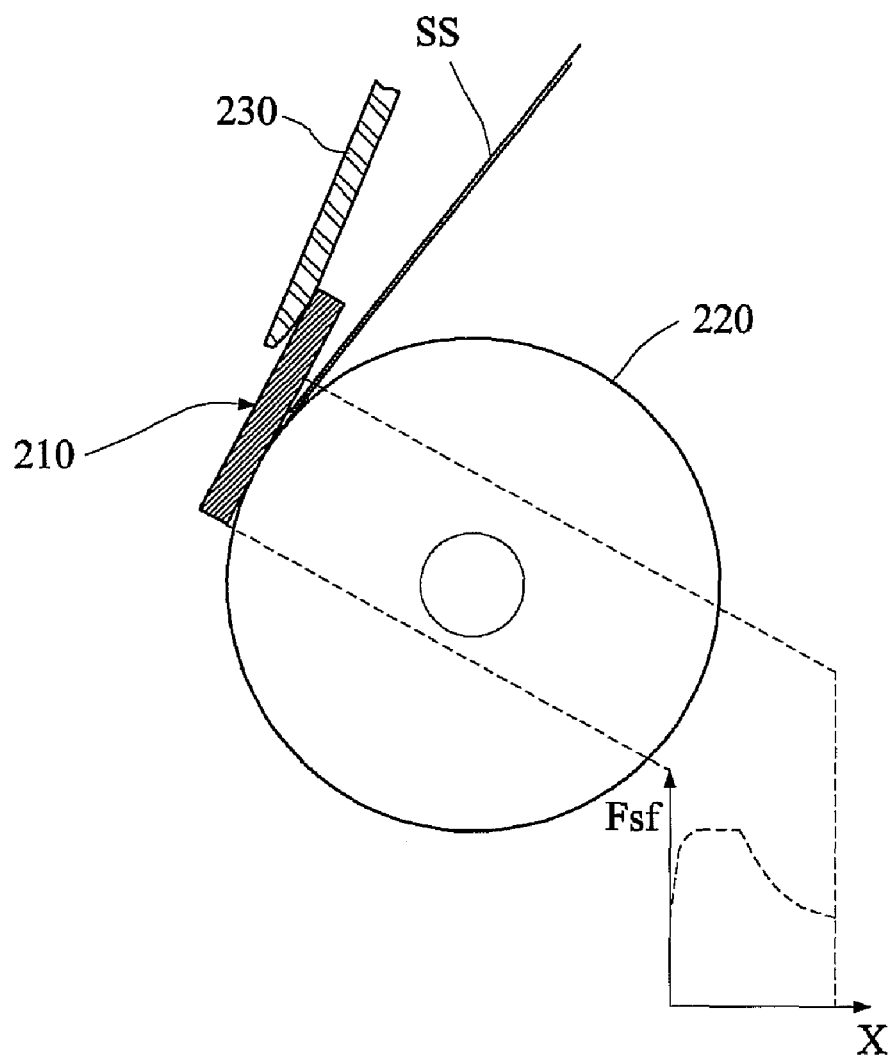
FIG. 9 is a schematic illustration of a conventional friction pad combined with the feeding roller.

By comparing the distribution curve of the static friction force in FIG. 2 with that in FIG. 9, it is found that the static friction in the overall elastic pad 10 of the present invention is more uniform, so the performance of the sheet separation operation becomes stabber, and the wearing and deterioration of the elastic pad caused by the nonuniform force can be slowed down. In addition, the combination of the feeding roller and the elastic pad of the present invention does not cause the bending of the thicker sheet or the cardboard (e.g., a credit card).

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A sheet feeding device, for transporting a sheet into a transporting path in an image processing apparatus, comprising:
   a feeding roller for feeding the sheet; and
   an elastic pad, bent and disposed opposite the feeding roller, applying an acting force to the feeding roller to separate the sheet from a stack of sheets by cooperating with the feeding roller, wherein the elastic pad has a first side and an opposite second side, the second side is formed with a groove, and the elastic pad is bent at an angle at the groove.

2. The device according to claim 1, wherein the first side faces the feeding roller.

3. The device according to claim 1, wherein the groove is extended crosswise of the elastic pad and positioned transversely to a transporting direction of the sheet.

4. The device according to claim 1, wherein a first end of the elastic pad is attached to a holder, and a second end of the elastic pad is a free end.

5. The device according to claim 4, wherein the elastic pad comprises:
   a first section, closer to the first end; and
   a second section, closer to the second end, wherein the second section is in pressure contact with the feeding roller, and the groove lies between the first section and the second section.

6. The device according to claim 5, wherein a nip is formed between the feeding roller and the second section and centered at a center line of the second section.

7. The device according to claim 5, further comprising a biasing member, disposed at a side of the second section, for urging the second section towards the feeding roller and applying a second acting force to the feeding roller.

8. The device according to claim 4, wherein the first end of the elastic pad has at least one positioning hole through which the elastic pad is mounted on the holder.

9. An image processing apparatus, comprising:
- a sheet feeding device, for transporting a sheet into a transporting path in the image processing apparatus, comprising:
  - a feeding roller for feeding the sheet; and
  - an elastic pad, bent and disposed opposite the feeding roller, for applying an acting force to the feeding roller to separate the sheet from a stack of sheets by cooperating with the feeding roller, wherein the elastic pad has a first side and an opposite second side, the second side is formed with a groove, and the elastic pad is bent at an angle at the groove; and
- an image processing module, disposed in the transporting path, for processing image data.

10. The apparatus according to claim 9, wherein the image processing module is a scanning module for scanning the sheet and generating the image data.

11. The apparatus according to claim 9, wherein the image processing module is a printing module for printing the image data on the sheet.

12. The apparatus according to claim 9, further comprising:
- a sheet-transporting mechanism, disposed downstream of the sheet feeding device, for transporting the sheet along the transporting path.

* * * * *